Figure 1:
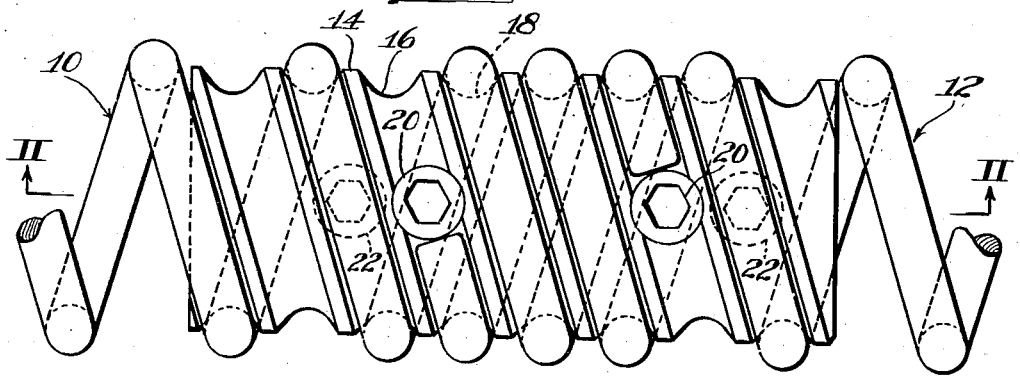

March 11, 1941.  K. I. ROBINSON ET AL  2,234,504

COILED WIRE COUPLING

Filed Nov. 1, 1938

WITNESSES
A. B. Wallace
E. O. Johns

INVENTORS
Kyle I. Robinson
Lawrence R. Robinson
BY Brown, Critchlow & Flick
their ATTORNEYS.

Patented Mar. 11, 1941

2,234,504

UNITED STATES PATENT OFFICE 2,234,504

COILED WIRE COUPLING

Kyle I. Robinson, Bolivar, and Lawrence R. Robinson, Zelienople, Pa., assignors to Pittsburgh Pipe Cleaner Company, Pittsburgh, Pa., a corporation of Pennsylvania Application November 1, 1938, Serial No. 238,188

8 Claims. (Cl. 287—75)

This invention relates to couplings or connectors for securing helically coiled elongated members together, and more particularly is concerned with means for securing flexible cables together, such as are used to clean out conduits which have been stopped up or which may be employed as flexible drive shafts or the like.

Helically coiled wire cables which may be used for flexible drives or for reaming or cleaning out drains, water pipes, and the like have attained a definite status in the art and can now be obtained from any good hardware store in a variety of lengths, as, for example, from 5 to 100 feet, and of a variety of diameters, as, for example, from ¼ of an inch up to several inches. The helically coiled members are furnished in a plurality of lengths and sizes to best adapt them for any particular use, but in actual practice it often becomes necessary to join several of the coiled members together.

One standard method of joining the flexible cables has been to braze them to a connecting coupling. This practice, however, is open to a number of objections which include the time and skill required to make the braze, and the fatigue and failure of the brazing material to adequately secure the members together. Moreover, a brazed connection is sometimes too long axially to permit the coupled members to make sharp turns, as is often requisite in cleaning out a conduit. Other known types of connectors are not only subject to the foregoing difficulties but are often expensive, difficult to attach or remove, and are unable to withstand axial or torsional stresses.

It is the general object of our invention to avoid and overcome the foregoing and other difficulties by the provision of an improved coupling for securing helically coiled elongated members together.

Another object of our invention is the provision of an inexpensive, easily attached coupling for joining helically coiled flexible cables together, which coupling is relatively short axially and which is capable of withstanding exceptionally heavy torsional or longitudinal strains.

Another object of our invention is the provision of a coupling of the type specified in which fluid can be passed through the center of the coupling.

The foregoing and other objects of our invention are achieved by the provision of a coupling for securing the ends of helically coiled elongated members together which coupling comprises a substantially cylindrical block having a multiple thread cut on its surface, the thread having one elongated member threaded thereon from each end of the block. The connected ends of the elongated members preferably extend by each other at the center of the block so as to be in threaded relation. Completing the combination there are preferably means for expanding the block to lock the members in place thereon. We may form a right and left hand thread on the same coupling to receive helically coiled members of opposite hand. In this form of our invention the ends of the members can not extend past each other, as will be evident, but can be made to abut against the same stop.

Figure 2:
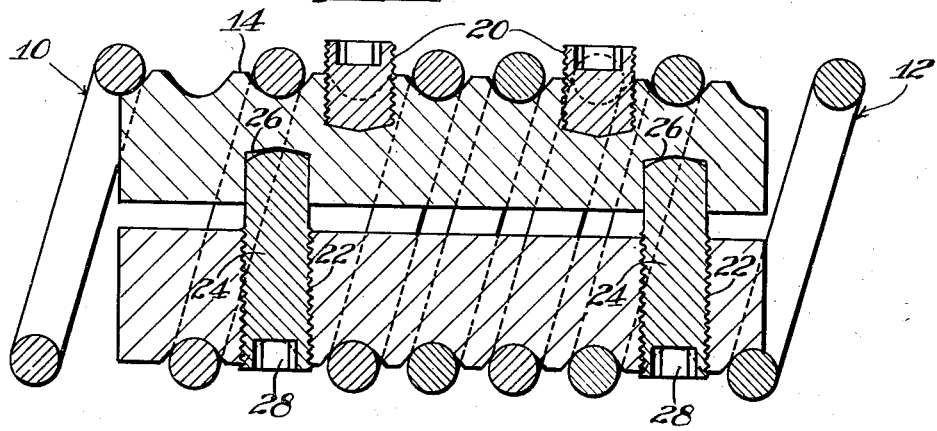
Figure 3:
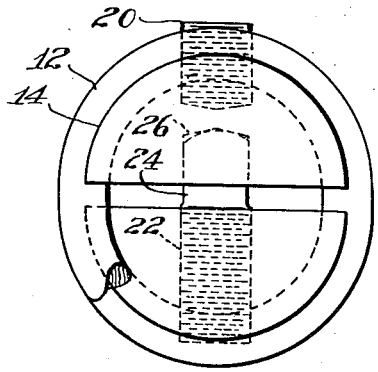
Figure 4:
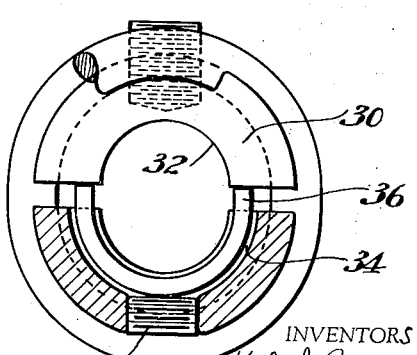

For a better understanding of our invention reference should be had to the accompanying drawing wherein Fig. 1 is a side elevation of one embodiment of our invention; Fig. 2 is a view similar to Fig. 1 but with the coupling turned through 90° about its longitudinal axis; Fig. 3 is an end view of the coupling shown in Figs. 1 and 2; and Fig. 4 is an end elevation partly in section of a modified form of our invention.

Referring particularly to the drawing, the numeral 10 indicates one end of a helically coiled elongated member or element such as a wire of spring metal, for example, steel. The numeral 12 indicates generally the end of a second member or flexible cable which is of similar diameter and in which the lead of the helically coiled convolution is identical, or substantially identical, with that of the first member 10.

The helically coiled ends of the members or cables 10 and 12 are threaded upon a substantially cylindrical block, indicated as a whole by the numeral 14, which is provided with a double thread, marked 16 and 18, on its periphery. The threads 16 and 18 are formed with a lead which is substantially identical to the lead of the helical convolutions of the ends of the coiled members 10 and 12. While this practice is preferred we may form the lead of the threads 16 and 18 either somewhat greater or less than the lead of the helical convolutions to be connected. The pitch diameters of the threads 16 and 18 are substantially equal to the pitch diameter defined by the axes of the helically coiled ends of the members so that as above stated the ends of the members can be threaded onto the block 14 from either end, as shown in Figs. 1 and 2. The pitch of the threads 16 and 18 is substantially equal to the cross sectional diameter of the helical convolutions of the ends of the coiled members 10 and 12 for a like reason.

By the arrangement of parts just described the end of the coiled member 12 can be threaded onto one end of the block and in the joining operation this threading is continued until the end of the member 12 is well past the center of the block 14. In a similar manner, the end of the member 10 can be threaded onto the other end of the block 14, and this threading operation is continued until the end of this member also is past the center of the block. When this is done the ends of the two coiled spring members extend by or past each other adjacent the center of the block 14 so as to be in threaded relation, as is clearly shown in Figs. 1 and 2. However, many of the advantages of the invention are retained even though the ends of the members do not extend by each other and we particularly contemplate such a construction although it is ordinarily not preferred. It will be understood that the use of the double thread on the block 14 permits the ends of the coiled members to interleave or extend by each other. We may form the block 14 with one right-hand and one left-hand thread when the helically coiled members to be connected are of opposite hand. In this case the ends of the members can not extend by each other at the center of the block, as will be evident.

We preferably employ some means on the block 14 which engage with the extreme ends of the members 10 and 12 and in the embodiment of our invention illustrated these means comprise studs 20 which may be cast integral or which are screwed or driven into suitable radial openings in the block 14 so that the studs 20 extend radially from the blocks to close off the threads 16 and 18, as shown. Instead of employing the radially extending studs 20 we may form radially extending openings in the block 14 and bend a small right angle portion on the extreme end of the coiled members 10 and 12, which right angle portion can be fitted into the radial openings in the block to thereby engage with or position the extreme ends of the members on the threads 16 and 18. This alternative practice is usually followed only on couplings of comparatively small size and when the cross sectional diameter of the wire forming the members is also relatively small.

Some means are preferably provided for expanding the block 14 in a radially outward direction to thereby assist in locking the helical convolutions of the ends of the members in place on the block. The particular expanding means may obviously take a variety of forms but we have illustrated in the drawing one convenient manner of accomplishing the desired result. Specifically, we form the block 14 in two parts each of which is one-half of a cylinder which has been split by an axial plane. One of the block parts is then formed with suitably tapped openings 22 which receive screws 24. The ends of the screws 24 preferably extend into suitable recesses 26 formed in the other block part although such recesses are not requisite. Thus by tightening the screws 24 the block parts are moved apart and when the screws are loosened the block parts may move together. Usually the screws 24 are formed with a socket, marked 28, at their free end, which socket is of hexagonal or other polygonal shape so that a suitable wrench or operating means can be connected to the screw.

It will be seen from Figs. 1 and 2 of the drawing that the studs 20 are positioned toward the center of the block 14, whereas the screws 24 are positioned one thread outwardly from the stud 20 and on a diametrically opposite side of the block which means that the screws 24 are never covered by the helical convolutions of the ends of the coiled members 10 and 12. In other words, each screw 24 is positioned in the valley of the same thread as the associated stud 20, and inasmuch as the stud prevents the end of the coiled member from passing farther along the thread the screw or screws 24 are always accessible for tightening or loosening.

It is believed that the operation of our improved coupling will be evident from the foregoing description. However, briefly summarizing, the screws 24 are retracted to allow the two parts of the block 14 to come into engagement and thereafter one coiled flexible cable or member is threaded on one end of the block and the other member is threaded on the other end of the block until the extreme ends of both members have passed somewhat by the center of the block and against the studs 20 so that the helically coiled ends of the members are in interleaved or overlapping relation. The screws 24 are now tightened to move the parts of the block 14 apart to thereby lock the ends of the members firmly in place upon the blocks. Disconnection of the parts is accomplished by a mere reversal of the operation.

In many instances we have found that the ends of the coiled members are locked solidly on the coupling without expansion of the coupling because turning the members in one direction moves them against the studs 20 on the coupling and moving the members in the other direction tightens the convolutions of the members about the block. However, to insure a tight connection under all and continued operating conditions we preferably expand the block as described.

The embodiment or modification of our invention shown in Fig. 4 differs very little from that already described. The coupling block of Fig. 4 is formed with an axial hole or opening therethrough to permit the circulation of fluid through the helically coiled members and the coupling. Because of the axial hole in the coupling block different expanding means are required.

Specifically, the numeral 30 indicates the connector or coupling block which is similar to the block 14 but which is formed with an axial aperture or bore 32 through which fluid may pass. In order to expand the two parts of the block 30 one of the block parts is provided with two or more semi-circular slots 34 which slidably receive half washers or yokes 36 for movement toward and from the other block part. Screws 38 received in tapped openings engage with the yokes 36 to force the block parts away from each other when the screws are tightened, all without closing off the bore 32.

From the foregoing it will be recognized that the objects of our invention have been achieved by the provision of an improved coupling for securing the ends of helically coiled wires or elongated members, such as flexible drive shafts or plumbers' snakes, together. The coupling is inexpensive and easily applied, and furthermore is relatively short in an axial direction so that it can readily pass quite abrupt turns in a conduit or other member through which the coupling is passed. A coupling constructed to incorporate the principles of our invention is particularly capable of withstanding and transmitting either torsional or axial strains and this is particularly true since the ends of the coiled members engage positively against means incorporated with the coupling.

While in accordance with the patent statutes we have specifically illustrated and described one embodiment of our invention, it should be appreciated that our invention is not limited thereto or thereby but is defined in the appended claims.

We claim:

1. In combination, a pair of helically coiled elongated members, a block, and a multiple thread cut thereon, the thread having an elongated member threaded in separate grooves of the thread from each end of the block, said elongated members extending past each other at their ends.

2. In combination, a piar of helically coiled elongated members of spring metal, a block having a double thread cut thereon, the thread having an elongated member threaded thereon from each end of the block, the connected ends of said elongated members extending by each other at the center of the block, and means for expanding the block to lock the members in place thereon.

3. In combination, a pair of helically coiled flexible drive shafts, a block having a double thread cut thereon, the thread having a helically coiled drive shaft threaded thereon from each end of the block, means on the block for engaging the ends of the drive shafts, and means for expanding the block to lock the shafts in place thereon.

4. In combination, a pair of helically coiled flexible cables, a block having a multiple thread cut thereon, the thread having a cable threaded thereon from each end of the block, the connected ends of said cables extending by each other in threaded relation at the center of the block, means on the block for engaging the ends of the cables, and means for expanding the block radially to lock the cables in place thereon.

5. In combination, a pair of helically coiled plumber's snakes, a block having a multiple thread cut thereon, the thread having a plumber's snake threaded thereon from each end of the block, the connected ends of said plumber's snakes extending by each other in threaded relation at the center of the block, and means on the block for engaging the ends of the plumber's snakes.

6. In combination, a pair of helically coiled wire members, a block having a multiple thread cut thereon, the thread having a member threaded thereon from each end of the block, and means on the block for engaging the ends of the members.

7. A coupling for securing the ends of helically coiled elongated members together comprising a block having a multiple thread cut on its surface, the lead, the pitch diameter and the pitch of the thread being substantially equal to the lead, the pitch diameter and the cross sectional diameter, respectively, of the helically coiled elongate members, means on the block near each end thereof for engaging with the end of an elongate member when it is threaded on the block from the other end, and means for expanding the block radially to lock the elongate members in position thereon.

8. A coupling for securing the ends of helically coiled elongated members together comprising a block having a multiple thread cut on its surface, the lead, the pitch diameter and the pitch of the thread being substantially equal to the lead, the pitch diameter and the cross sectional diameter, respectively, of the helically coiled elongate members, and means for expanding the block radially to lock the elongated members in position thereon.

KYLE I. ROBINSON.
LAWRENCE R. ROBINSON.